United States Patent [19]

Hendel

[11] 4,110,630
[45] Aug. 29, 1978

[54] WAVE POWERED ELECTRIC GENERATOR

[76] Inventor: Frank J. Hendel, 721 Johnson Ave. #83, San Luis Obispo, Calif. 93401

[21] Appl. No.: 783,549

[22] Filed: Apr. 1, 1977

[51] Int. Cl.² .............................................. F03B 13/12
[52] U.S. Cl. ........................................ 290/53; 9/8 R;
290/42; 310/11
[58] Field of Search .................................. 60/495–502,
60/506, 507; 290/1, 42, 53; 310/11; 9/8 R, 8.3
E; 417/61, 328, 330, 331, 337

[56] References Cited

U.S. PATENT DOCUMENTS

| 1,082,746 | 12/1913 | Hemmenway | 290/42 |
| 2,583,724 | 1/1952 | Broding | 310/11 |
| 3,200,255 | 8/1965 | Masuda | 290/42 |
| 3,204,110 | 8/1965 | Masuda | 290/42 |

FOREIGN PATENT DOCUMENTS

| 19,285 | 3/1968 | Japan | 290/53 |
| 29,887 of | 1913 | United Kingdom | 290/53 |

OTHER PUBLICATIONS

Geomagnetism by Chapman & Bartels, 1944, pp. 445–448.

Primary Examiner—Robert K. Schaefer
Assistant Examiner—John W. Redman
Attorney, Agent, or Firm—Spensley, Horn & Lubitz

[57] ABSTRACT

A wave powered electric generator using direct energy conversion is described which includes, within a water and airtight, buoyant envelope tethered to a fixed point relative to the sea bottom, one or more stators and one or more elements moveable by the force of inertia, the relative motion of the moveable element within the stator generating electricity. Also within the buoyant envelope is a rectifier for rectifying the electric energy generated by the moveable element, and power transmission means for supplying the generated and rectified electric energy to a power station. In a preferred embodiment, a conductive fluid is employed as a moveable element, this fluid being passed through a concentrated magnetic field, the resultant electrical power being tapped by electrodes whose axis preferably is orthagonal to the field and direction of fluid motion.

6 Claims, 8 Drawing Figures

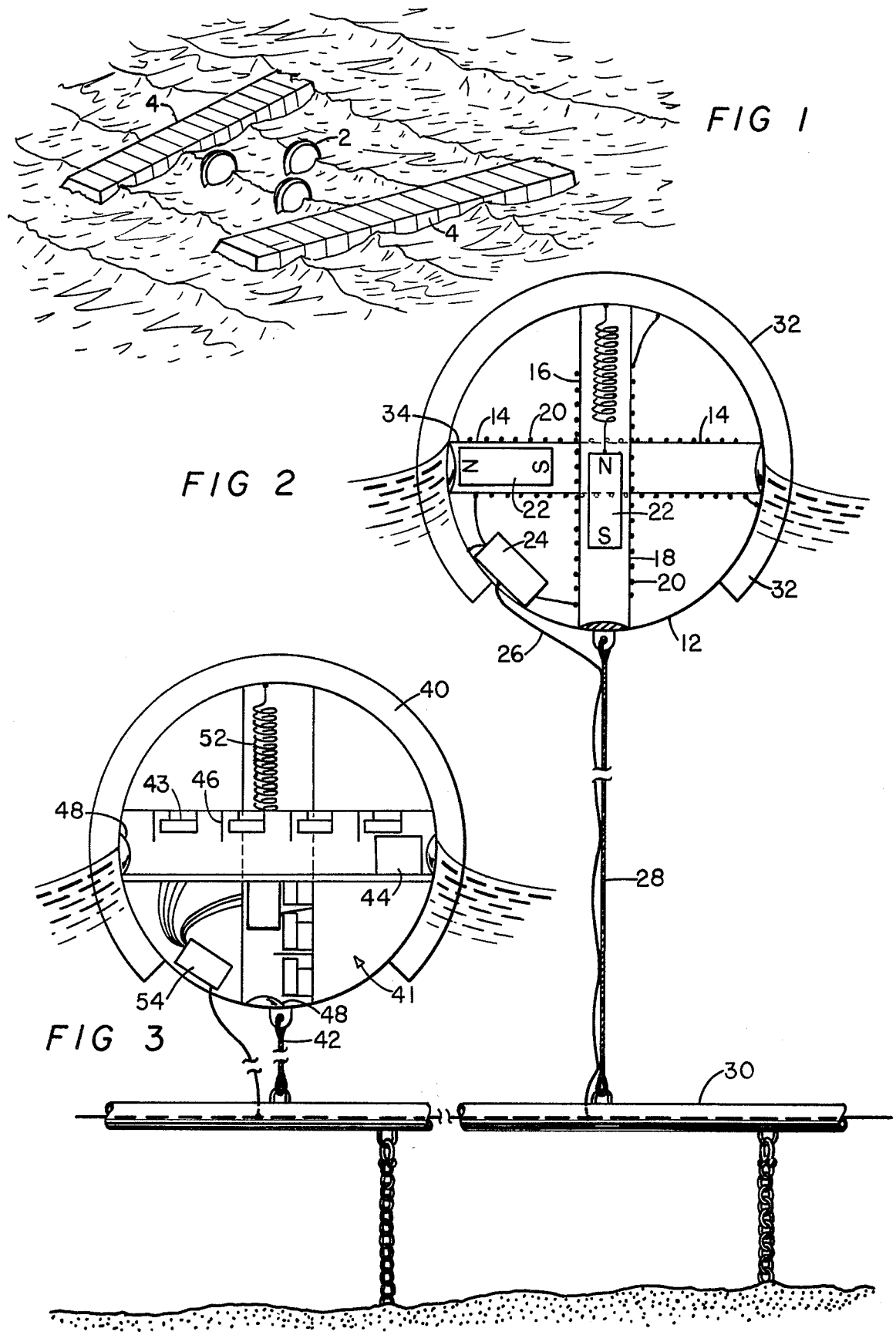

WAVE POWERED ELECTRIC GENERATOR

BACKGROUND OF THE INVENTION

This invention relates to a wave-powered electric generator, particularly one designed for direct energy conversion of deep water wave motion to an electromotive force.

With the ever-increasing need of industrialized nations for power, and with the increasing problems posed by conventional sources of power, the development of new power sources is becoming of critical importance. One such power source is that represented by ocean waves. It has been estimated that the total wave power available in the world's oceans may be as high as $90 \times 10^{15}$ watts—indeed an immense amount of power—and that the renewal rate of this power source is on the order of $10^{12}$ to $10^{13}$ watts. Wave power is clean, safe and permanent. Certainly then, wave power potentially could be quite important as a power source. Yet, while there is an increasing interest in this potential source of power, few practical systems presently exist to extract any significant amount of power from the ocean's waves.

An objective of this invention is to provide a practical wave-powered electric generator, one which can be tethered to an ocean bottom and generate electric power substantially unattended. The generator should be simple, sea-worthy, and rugged in construction, yet offer significant amounts of electric power over a wide range of wave periods. It should provide a power output both at low levels and high levels of wave motion. These and other objectives of the invention will appear from the following description of preferred embodiments.

SUMMARY OF THE INVENTION

Various enbodiments of a wave-powered electric generator are described which include, within a buoyant envelope tethered to a fixed point relative to the sea bottom, one or more stators each including a moving element, called a rotor, as well as a rectifier for rectifying the electric energy generated by relative motion of the rotor element within the stator as the buoyant envelope is subjected to wave motion, and power transmission means for supplying the generated and rectified electric energy to a power station. In one embodiment, both the stator and rotor are fixed to move with the buoyant envelope, the stator preferably maintaining a given orientation relative to the buoyant envelope while the rotor is gear driven to rotate within the stator. In another embodiment, a sloshing liquid is employed as the element which physically drives the rotor to produce electrical power. In another embodiment, the liquid, a conductive fluid, is passed through a magnetic field, the resultant electrical power being tapped by electrodes whose axis is orthogonal to the field and fluid motion. In still another embodiment, a plurality of stators are provided each receiving a moving element, the stators in one case including an electrically conductive winding while the rotor element generates a magnetic field and produces an electromotive force in the stator winding in response to wave motion. In yet another case, the stator incorporates piezoelectric elements mounted adjacent to a plate which vibrates upon being struck by the rotor element as it moves within the stator, the plate vibrating to strike the piezoelectric element and generate electricity.

All of the above embodiments of the invention have a "moving" solid or liquid element which tends to be stationary within a fully enclosed buoyant envelope. The latter envelope moves with the motion of the waves and transfers its momentum to the enclosed elements which, being passive, exerts its force of inertia by relative movement within the buoyant envelope. At the same time the fully enclosed envelope protects all its internal members from the destructive, corrosive, and fouling environment of sea water and the air.

BRIEF DESCRIPTION OF THE DRAWINGS

The invention will be further described in connection with the accompanying drawings in which:

FIG. 1 is a perspective view of a typical installation of the wave-powered electric generators described in this application;

FIG. 2 is a vertical cross-sectional view of one embodiment of the wave-powered electric generator;

FIG. 3 is a view in vertical cross-section of another embodiment of the wave-powered electric generator;

DETAILED DESCRIPTION OF THE PREFERRED EMBODIMENTS

Figure 4:
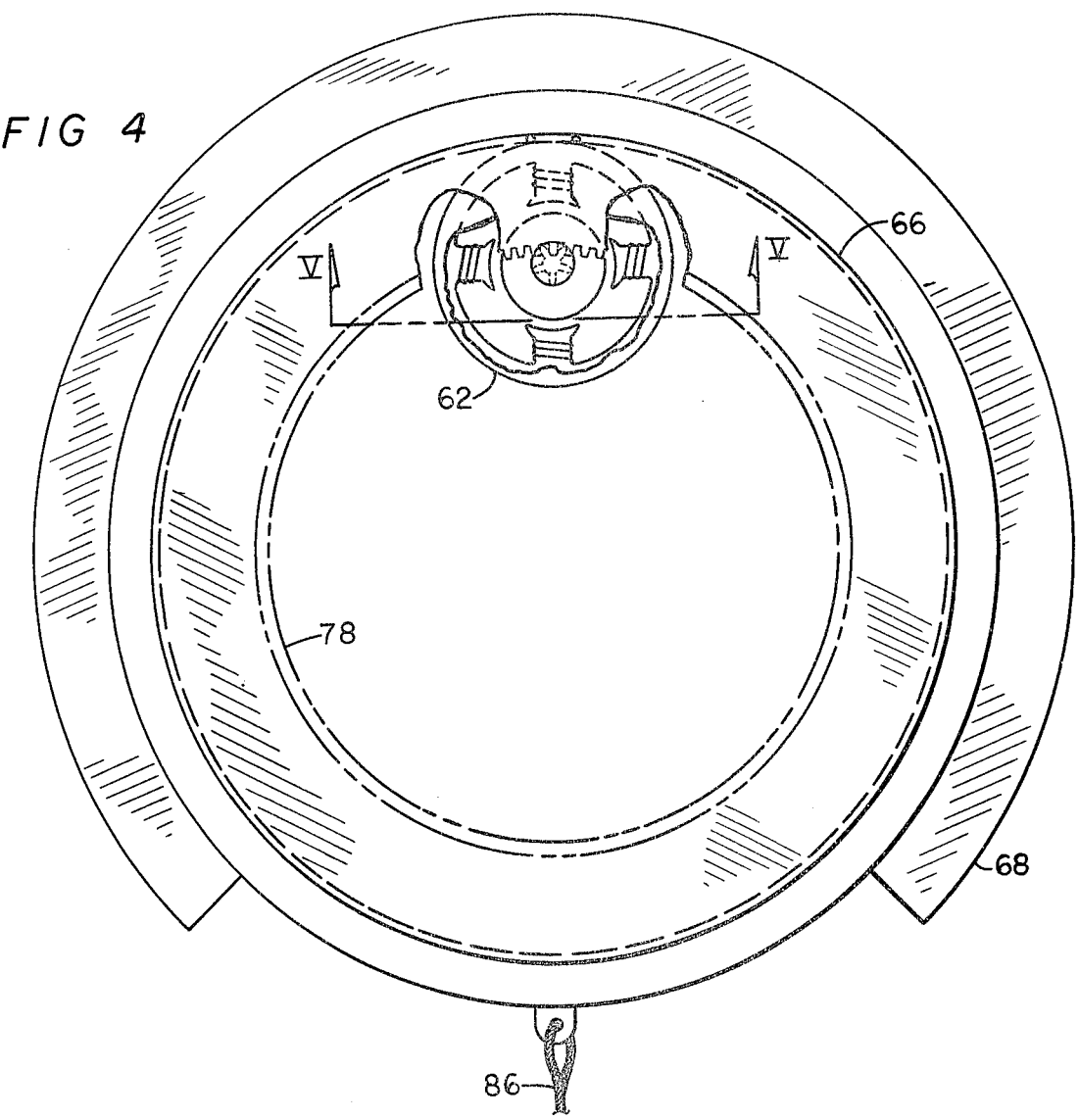
FIG. 4 is a view in vertical cross-section of still another embodiment of the wave-powered electric generator.

In this detailed description, various preferred embodiments of the invention are described. They all are designed with common principles in mind, and include common features. Of course, various other embodiments of the invention will be apparent to those skilled in this art, and may be preferred by them.

The wave-powered electric generators of this invention are designed to take advantage of the motion of a water particle in a wave. Considering deep water waves, as the wave passes a given point, the motion of a water particle near the surface defines a circle, the particle moving forward with the wave as the wave crest passes, dropping until the trough of the wave is reached at which point the water particle moves in a reverse direction relative to the apparent motion of the wave crests, then rises to the next crest. As the sea bottom rises in shallow areas, this circular motion becomes somewhat flattened. Accordingly, while it is preferred that the disclosed wave-powered electric generators be used in deep sea conditions, they also can be used at off-shore locations.

A typical installation of the wave-powered electric generators is illustrated in FIG. 1. Three generators 2 each are tethered to the ocean bottom preferably between two natural ridges or seawalls 4, these seawalls converging adjacent the tethered generators to focus and amplify the waves entering the space between the seawalls. While the seawalls may be completely submerged, preferably they are high enough to sufficiently amplify waves of small amplitude entering the space between the seawalls, the amplification achieving a magnitude sufficient to impart substantial motion to the electric generators to achieve production of reasonable amounts of electric power. However, the seawalls preferably are not so high that a wave magnitude is produced in heavy seas which threatens the structure or tethering of the generators. In other words, as heavy seas build, they begin to pass over the top of the seawalls, thereby limiting the amount of amplification achieved at the location of the electric generators.

One preferred embodiment of the wave-powered electric generator is illustrated in vertical cross-section in FIG. 2. It includes, within a buoyant, generally spherical envelope 12, a horizontal stator-moving element assembly 14 and a vertical stator-moving element assembly 16. Each such linear generator assembly includes a stator 18 in the form of an elongated cylindrical member about which is wound an electrically conductive coil 20, a moving element (hereafter sometimes being called a rotor element or rotor) 22 being received within the cylindrical stator member. The moving element 22 preferably consists of a permanently magnetized member. Accordingly, as the buoyant envelope moves in a generally circular path in response to the motion of passing waves, the moving element 22 in response to inertia forces will oscillate within stator 18, and its magnetic field passing the conductive winding 20 will generate an electromotive force. Windings 20 are connected to a rectifier 24. Thus, as the magnetized rotor oscillates within the stator, an electric current will be produced in the windings, first of one polarity and then of another. Preferably a rectifier 24 connected to the stator's windings converts this alternating current into a direct current which is supplied to a shore or water based power station over a conductor 26. Conductor 26 preferably is attached to a tether line 28 which secures the buoyant envelope to a sub-surface member such as a railing structure, an anchor, or the like. This anchoring or railing structure 30 preferably is a submarine structure (as shown in FIG. 2), the level of which automatically adjusts to changes in sea level, or which can be remotely controlled to maintain the buoyant generator structures at a given location between the seawalls. Surrounding the buoyant envelope is a vane 32 which acts as a rudder and serves to maintain an orientation of the envelope within the wave field such that the longitudinal axis of stator 18, an axis which is parallel to the plane defined by the vane, is generally perpendicular to the wave front. Thus, as the waves pass over the buoyant envelope, rotor 22 will oscillate back and forth within the stator. Preferably at each end of the rotor element is a resilient bumper member 34 to absorb the energy imparted by the rotor as it reaches the end of the stator.

The buoyant envelope also includes, preferably, at least one other stator-rotor assembly 18' – 22', the longitudinal axis of this stator being generally parallel to the diameter through the buoyant envelope defined by the tether line. Rotor 22' is attached to the buoyant envelope by a spring 36 of sufficient force to counteract the mass of the rotor, thereby encouraging the rotor element to oscillate freely within the stator as waves pass over the buoyant envelope.

In light seas, the buoyant envelope basically rocks back and forth causing rotor 22 to move back and forth within stator 18 throughout its full extent, but causing rotor 22' to only oscillate to a slight extent within stator 18'. Thus, a low but significant level of direct current will be generated by this structure. As the seas build, the rate of motion of rotor 22 within stator 18 increases, and the extent of motion of rotor 22' within stator 18' increases, both effects significantly increasing the power generated by this structure. Thus, the generator will produce electrical power over a wide range of wave conditions and periods.

Another embodiment of the wave-powered electric generator is illustrated in vertical cross-section of FIG. 3. It also enploys at least two stator-rotor assemblies, one being generally perpendicular to the direction of passage of the waves over the generator as defined by the vane 40 enveloping the buoyant envelope 41, the axis of the other, vertical, stator-rotor assembly being generally parallel to the diameter defined by the tether line 42. This generator includes a series of piezoelectric stator elements 43 within each stator-rotor assembly, and a rotor element 44. As the rotor element moves back and forth within the stator member, it strikes in sequence a series of resilient plates 46. Adjacent to each of these plates is mounted a piezoelectric element 43. Upon being struck by the stator element, the resultant vibrations in each plate 46 is imparted to one end of the piezoelectric element causing it to vibrate and generate electric power. At each end of the horizontal stator is included a resilient member 48 that absorbs the remaining energy not absorbed by resilient plates 46 when the rotor element 44 reaches the end of the stator. As in the previously described embodiment, preferably the vertically oriented stator-rotor assembly includes spring means 52 attaching it to the upper surface of the buoyant envelope and counteracting the force of gravity on this rotor element and to permit it to oscillate freely within the stator. A rectifier 54 also is incorporated within the buoyant envelope. It is electrically attached to each piezoelectric element, preferably dynamically phasing the electrical energy output produced by each piezoelectric element to produce a single, in phase output. The electrical output of the buoyant generator is led, preferably alongside the tether 42, to the sea bottom or a railing structure to which the buoyant structure is tethered and then to a shore or water based power station for distribution and utilization.

Figure 5:
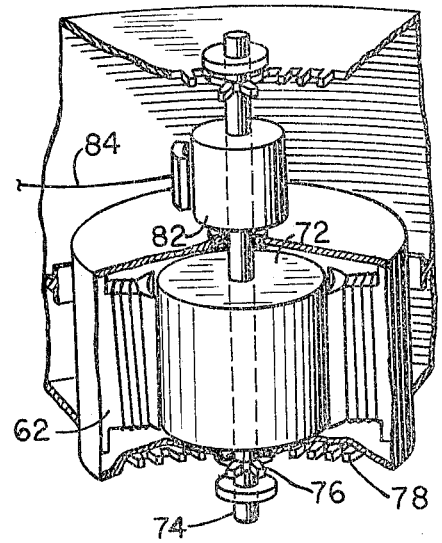
FIG. 5 is a view along line V—V of FIG. 4.

Still another embodiment of the invention is illustrated in FIGS. 4 and 5, FIG. 4 being a vertical cross-section of the generator generally similar to the views shown in FIGS. 2 and 3. In this embodiment, the generator employs a cylindrical stator member 62 which is attached to a track or rail 64 along the inner surface of the buoyant envelope 66. About the buoyant envelope is a vane 68 to orient the envelope relative to the direction of waves. This attachment of the stator to the inner surface of the buoyant envelope maintains the stator at a given radial orientation with respect to the envelope, causing it to perform one revolution each time it revolves completely within the buoyant envelope. The stator includes appropriate structures, such as a series of permanent magnets, to produce internally a magnetic field. Mounted within the stator, as best shown in FIG. 5, is a rotor element 72 received upon shaft 74 coupled preferably by ball bearings to the housing of the stator. Shaft 74 also bears spur gears 76, one at each end of the shaft, which gears engage a rack gear 78 mounted within the buoyant envelope. The rotor shaft also includes a commutator structure 82 which converts the power generated within the rotor into a direct current that is led from the buoyant envelope by a conductive element 84 preferably attached alongside the tether 86, and then to a shore-based station for distribution. If desired, the mechanical connection of the stator to the buoyant envelope also may provide an electrical connection as well to convey the current generated by the rotor to the conductive element 84.

As waves, whatever their period, pass the buoyant envelope, it will oscillate causing the stator-rotor assembly to rock back and forth within the buoyant envelope. In response, because of the construction of the generator the rotor will be rotated within the stator, first in one direction and then the other, the stator being held in a fixed orientation with respect to the buoyant envelope while the rotor is gear driven by rack gear 78 to rotate within the stator. This motion will generate an electromotive force within the windings of the rotor, producing a current that is led from commutator 82 by the electric cable 84 to a shore or water based power station. As the magnitude of the seas passing the buoyant envelope increases, a point will be reached at which the stator-rotor assembly will rotate completely about the buoyant envelope. Preferably the dimensions of the envelope and the mass of the stator-rotor assembly is adjusted to resonate within the normal or expected range of frequencies of the waves at the intended location of the generator, causing the stator-rotor assembly to rotate fully within the buoyant envelope and generate continuous and substantial electrical power. While the stator assembly may include poles about which are wrapped electrical windings to generate a magnetic field upon application of power, such as from the shore or water based power station, preferably these poles are permanently magnetized, thereby simplifying somewhat the structure.

In order to achieve and maintain a relatively high rotary speed for the rotor at fairly low seas, the power station may temporarily supply electrical power to the rotors of the wave-powered electric generator via the commutators causing the motor action in the generators. When and while a high rotary speed is achieved, the wave impulses will cause the rotors to generate electric energy at a greter efficiency.

Figure 6:
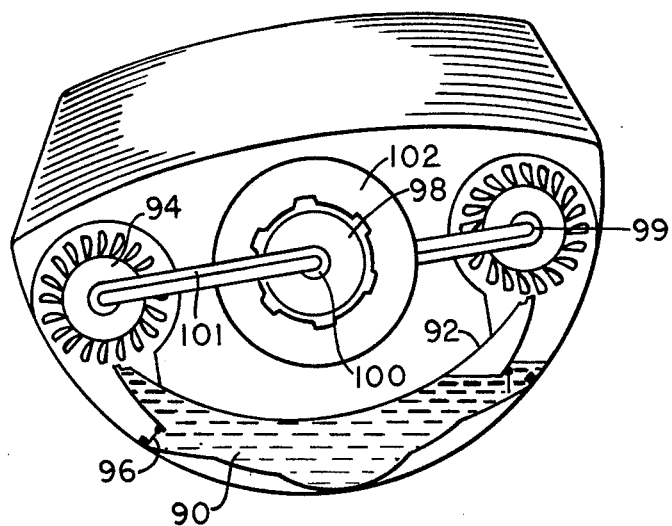
FIG. 6 is a view in vertical cross-section of another embodiment of the wave-powered electric generator.

A further embodiment of the wave-powered electric generator is illustrated in FIG. 6. It employs a sloshing liquid 90 contained within a chamber 92, which is shaped to direct, at each end, a jet of the liquid against the vanes or buckets of a bucket wheel 94. As the float structure, preferably a cylindrical structure shaped in cross-section generally as illustrated, alternately heaves and falls at each end with the waves, liquid 90 sloshes within chamber 92, first directing a jet of liquid against one bucket wheel and then against the other. The fluid expelled as a jet is contained about the bucket wheel by an extension of the chamber and flows back into the chamber 90 through and past a check valve 96, one of which is provided at each end of the chamber. As the bucket wheels are caused to rotate by impingement of the jets of liquid, each being mechanically and hydraulically linked to rotor 98 through a pump 99 and turbine 100, the fluid circulating through conduits 101, they cause the rotor to rotate within stator 102 in the same direction and generate electrical power. This power is transmitted to a power station and used as previously described. If desired, a pneumatic system may be used instead of the hydraulic system, the pump then being a compressor of either axial or centrifugal type. Preferably, liquid 90 is a dense liquid, such as mercury, to impart a substantial force against the bucket wheels 94.

Figure 7:
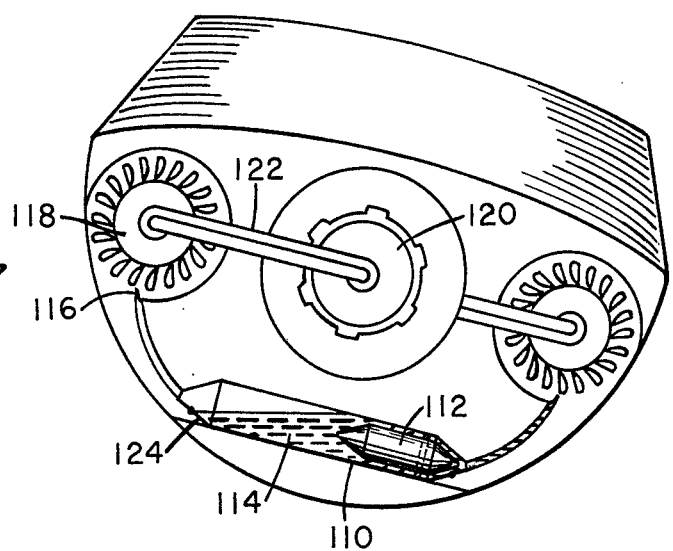
FIG. 7 is a view in vertical cross-section of still another embodiment of the wave-powered electric generator.

Of course, various modifications might be made in this structure. For example, instead of permitting the liquid to slosh freely within chamber 92 in response to wave motion, the liquid could be powered by a piston of substantial mass that moves by inertia force within the chamber. Such a variation is illustrated in FIG. 7, in which within chamber 110 is contained a freely moving piston 112 and liquid 114. As the buoyant envelope, again preferably a cylindrical structure shaped as shown, alternately bobs about at each end in the waves, piston 112 will slide first towards one end and then the other end. This movement, and the mass of the piston, will eject liquid 114 from a nozzle 116 of the chamber and against an associated bucket wheel 118, two nozzles and two bucket wheels being provided as shown. After striking the bucket wheel and causing it to rotate to drive the electric generator 120 through a mechanical and hydraulic linkage 122, this liquid flows back into the chamber 110 through a check valve 124.

Figure 8:
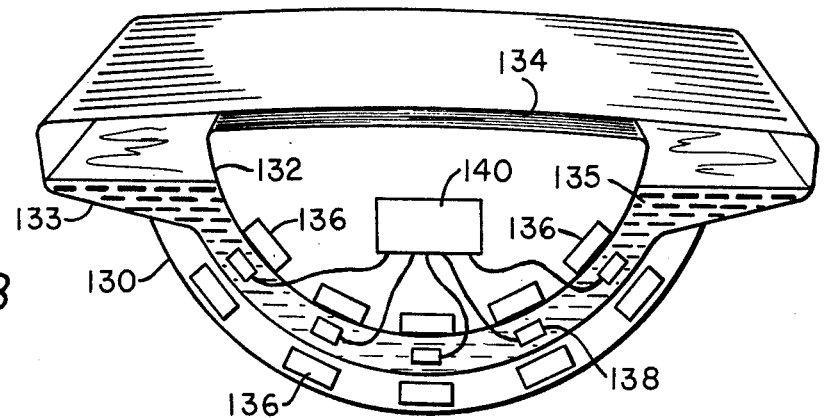
FIG. 8 is a view in vertical cross-section of a further embodiment of the wave-powered electric generator.

A still further embodiment of the wave-powered generator is illustrated in FIG. 8. It provides, within a buoyant envelope 130, preferably shaped as illustrated, one or more magnetically transparent containers 132, provided with holding tanks 133 and pressure equalizing air passage 134. Within this container or conduit is a conductive fluid 135, preferably mercury. About the container are magnet assemblies 136, each assembly providing a north and south pole in a radially opposed relationship, the conductive fluid flowing through the concentrated magnetic field established by this assembly. Electrode pairs 138 are provided in an orthogonally opposed relationship to the magnetic field and to the flow of liquid. As the liquid flows within the field, it will generate an electric current between electrodes 138, this effect commonly being referred to as a magnetonydrodynamic effect (although actually it is a magneto-fluid-mechanic effect). The current is conducted to a rectifier 140 which in turn integrates it with electric power from other electrodes and supplies the combined, integrated currents over an electric cable to a power station as previously described.

The mechanisms of FIGS. 6 or 7 advantageously may be combined with those shown in FIG. 8, if desired. To do this, a conductive fluid would be employed as the sloshing liquid, a magnetically transparent chamber provided, and one or more magnetic assemblies added, each with an associated electrode pair. Thus, as the liquid sloshed within the chamber to drive the bucket wheels it would flow through the magnetic field established by the magnetic assemblies and generate electricity, which power may be integrated with that produced by the electric generator driven by the bucket wheels and supplied to a power station.

As will be obvious from the foregoing description of five preferred embodiments of the wave-powered electric generator, a simple, rugged, durable structure is provided in each instance that will generate significant amounts of electric power even in light seas. As seas increase, increasing amounts of electric power will be generated and supplied to the shore or water based station for distribution. It will also be apparent to those skilled in this field that further stator-rotor assemblies could be provided within each buoyant envelope, particularly for the structures illustrated in FIGS. 2 and 3. Such additional stator-rotor assemblies will increase the power produced by the wave-powered electric generator. It will also be apparent to those skilled in this field that while the electric generator has been described in an ocean environment, being tethered to float at or adjacent to the ocean's surface, the generator could be tethered to float beneath the ocean's surface to respond to waves, currents, tides or the like, or it could be rendered atmospherically buoyant and tethered to float in wind currents. It is designed to be powered by wave motion, whatever the source of the waves.

While specific embodiments of the preferred electric generator have been described, the scope of the invention should not be limited to these particular embodiments. Rather, it is set forth in the following claims.

I claim:

1. A wave-powered electric generator comprising:
   a buoyant envelope which is fully water tight and air tight;
   a container within the buoyant envelope shaped to permit liquid within it to move relative to the walls of the container as the buoyant envelope is subjected to wave motion;
   a conductive liquid received within the container;
   means applying a concentrated magnetic field to at least some of the conductive liquid received within the container;
   electrode means positioned to receive at least some of the electrical energy generated as the conductive liquid passes through the concentrated magnetic field;
   means connected to the electrode means for rectifying the electrical energy generated by relative motion of the conductive liquid within the magnetic field; and
   power transmission means for supplying the generated, rectified electric energy to a power distribution station.

2. A wave-powered electric generator as set forth in claim 1 in which the magnetic means comprise a plurality of permanent magnets, the generator including a plurality of electrode means, a set of electrodes being associated with each permanent magnet and in which the rectifying means integrates the electric energy generated by the plurality of electrode means.

3. A wave-powered electric generator as set forth in claim 1 in which the tether means includes a submerged structure anchored to the sea bottom, this structure including means maintaining it at a substantially constant distance beneath the surface of the sea as the tide ebbs and flows.

4. A wave-powered electric generator as set forth in claim 1 including means to orient the buoyant envelope relative to the direction of the waves.

5. A wave-powered electric generator as set forth in claim 1 in which the buoyant envelope is an elongated, cylindrical structure shaped in cross-section to extract substantial force from the passage of waves, the container including an enlarged, liquid holding tank at each end and a conduit of generally uniform cross-section connecting the tanks, the magnetic field being applied to the liquid within the conduit.

6. A wave-powered electric generator as set forth in claim 1 in which the conductive liquid is mercury.

* * * * *